US006472677B1

(12) United States Patent
Rodriguez et al.

(10) Patent No.: US 6,472,677 B1
(45) Date of Patent: Oct. 29, 2002

(54) DEVICES AND METHODS FOR TRANSMUTING MATERIALS

(75) Inventors: Carmelo Rodriguez, Cardiff, CA (US); Alan M. Baxter, Los Alamos, NM (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 09/511,749

(22) Filed: Feb. 24, 2000

(51) Int. Cl.[7] .............................................. G01N 15/06
(52) U.S. Cl. ..................... 250/573; 250/222.2; 376/156
(58) Field of Search ................................ 250/573, 574, 250/222.2, 221, 559.33; 376/171, 189, 172, 156, 158, 194, 195

(56) References Cited

U.S. PATENT DOCUMENTS 4,780,682 A 10/1988 Politzer
4,987,007 A 1/1991 Wagal
5,160,696 A * 11/1992 Bowman .................... 376/189
6,233,298 B1 * 5/2001 Bowman .................... 376/171

OTHER PUBLICATIONS

Churkin et al., Universal Metal Ion Source, pp 822–824, Review of Scientific Instruments, vol. 69, No. 2, Feb. 1998.

* cited by examiner

*Primary Examiner*—Que T. Le
(74) *Attorney, Agent, or Firm*—Nydegger & Associates

(57) ABSTRACT

A transuranic transmuter includes a sealable steel housing having a window to allow a beam of protons to enter the housing and strike a spallation target, thereby generating fast neutrons. Conductive tubes holding minor actinides are positioned within the housing and at a distance from the spallation target. A graphite block is positioned within the housing to interpose the minor actinides between the graphite block and the spallation target. Plutonium and toxic fission products are positioned in recesses formed within the graphite block. Upon exposure to fast neutrons from the spallation target, the minor actinides transmute by either fission or neutron capture reactions into one or more stable, less radiotoxic isotopes. Some neutrons from the target pass through the moderator and subsequently transmute the plutonium and the toxic fission products into one or more stable, less radiotoxic isotopes.

20 Claims, 3 Drawing Sheets

DEVICES AND METHODS FOR TRANSMUTING MATERIALS

FIELD OF THE INVENTION

The present invention pertains generally to devices and methods for the destruction of high level radioactive waste. More particularly, the present invention pertains to devices which use neutrons to transmute high level radioactive waste into more stable, less radiotoxic materials. The present invention is particularly, but not exclusively, useful for transmuting minor actinides, toxic fission products and plutonium into stable isotopes in a single process.

BACKGROUND OF THE INVENTION

It is well known that spent nuclear fuel is highly radiotoxic and poses several challenging threats to mankind including; nuclear proliferation, radiation exposure and environmental contamination. To date, approximately 90,000 spent fuel assemblies containing about 25,000 tons of spent radioactive fuel are stored in the United States. Additionally, spent fuel assemblies are generated each year, so that it is estimated there will be about 70,000 tons of spent fuel waste by the year 2015. Since the United States currently has no permanent storage facility in operation, this high level radioactive waste is stored 'temporarily'. About 95% of this radiotoxic material is temporarily stored at the point of generation (i.e. at the power plant), awaiting a long term solution. At the power plants, the high level radioactive waste is primarily stored in water pools, with a small amount being stored in dry storage (casks). One long-term solution requires burying the waste in containers which are required to retain their integrity for at least tens of thousands of years. In addition to cost and feasibility problems, proposed burial sites have met with staunch local opposition.

Instead of burying or storing radioactive waste, another solution is to transmute high-level radioactive waste into one or more stable, less radioactive isotopes. One source of high-level radioactive waste that is of particular concern here is the spent fuel removed from a typical commercial nuclear power plant. Generally, this spent fuel contains four major constituents; uranium (about 96%), plutonium (1%), minor actinides (0.1%) and fission products (balance). The uranium and a portion of the fission products become no more radiotoxic than natural uranium ore in a relatively short time, and consequently, do not require special burial or transmutation. The remaining constituents including the plutonium, minor actinides and a portion of the fission products such as Iodine and Technetium (hereafter referred to as toxic fission products) require special burial or transmutation. To efficiently treat the spent fuel by transmutation, the spent fuel must be separated into the following four groups; plutonium, minor actinides, toxic fission products and non-radiotoxic materials.

It is known that, after the spent fuel has been separated, the radiotoxic constituents can be transmuted by reaction with neutrons into one or more stable isotopes. For example, the separated plutonium can first be transmuted by reaction with neutrons in a self-sustaining, critical, thermal neutron reaction. In such a self-sustaining critical reaction, a large percentage of the plutonium will transmute into more stable, less radiotoxic isotopes. Further, it is known that additional levels of plutonium transmutation (beyond that achieved in the self-sustaining critical reaction) can be obtained in a sub-critical thermal neutron reaction. In the sub-critical thermal neutron reaction, thermal neutrons (i.e. neutrons having energies of less than approximately 100 eV) must be supplied from a source such as a particle accelerator. By conducting irradiation experiments in thermal reactors, experimenters have demonstrated the capability to successfully destroy about 99% of the radiotoxic Pu-239 isotope.

Also, it is known that the minor actinides which are separated from the spent fuel can be transmuted to one or more stable, less radiotoxic isotopes. Specifically, this can be accomplished by the reaction of the minor actinides, which are considered non-fissile, with fast neutrons (i.e. neutrons having energies greater than approximately 100 eV). It is further known that fast neutrons can be generated by bombarding a spallation target with a beam of protons which are generated by a particle accelerator. Further, it is recognized in the pertinent art that toxic fission products separated from the spent fuel can be successfully transmuted into more stable, less radiotoxic isotopes by reaction of the toxic fission products with externally supplied thermal neutrons.

In light of the above, it is an object of the present invention to provide devices suitable for transmuting plutonium, minor actinides and toxic fission products in a single process. It is another object of the present invention to provide passively safe devices for the transmutation of separated spent radioactive fuel. It is yet another object of the present invention to provide devices that are capable of simultaneously transmuting both fissile and nonfissile radioactive materials. It is yet another object of the present invention to provide accelerator driven transmutation devices which are efficiently sized after taking advantage of plutonium's ability to undergo a critical, selfsustaining thermal neutron fission reaction. Yet another object of the present invention is to provide transmutation devices which are easy to use, relatively simple to manufacture, and comparatively cost effective.

SUMMARY OF THE PREFERRED EMBODIMENTS

In accordance with the present invention, a transuranic transmuter for transmuting high-level radioactive waste includes a sealable, cylindrical housing having a window that allows a beam of protons to pass through the window and into the housing. A spallation target is positioned inside the housing and along the proton beam path. Fast neutrons are thereby generated when the beam of protons enters the housing and strikes the spallation target.

Conductive tubes containing minor actinide microspheres are positioned as a layer inside the housing and immediately adjacent to the spallation target. Specifically, these tubes are positioned inside the housing to partially surround the spallation target. The minor actinide microspheres are approximately 1.5 mm in diameter and coated with ceramic material. Also, a block of graphite formed with recesses to hold toxic fission products and plutonium is positioned behind the tubes containing the minor actinides to interpose the minor actinides between the spallation target and the graphite block. Like the minor actinides, the plutonium and toxic fission products are formed as 1.5 mm microspheres and coated with ceramic. Within the graphite block, the toxic fission products are positioned in recesses that are closer to the spallation target than the recesses containing the plutonium.

Helium is circulated through the housing and between the conductive tubes to regulate the temperature inside the housing. Also, the graphite block is formed with cooling channels to further allow the helium to circulate within the graphite block.

In operation, the transmutation of the radiotoxic material can be efficiently conducted in a two-step process. In the first step, a critical, self-sustaining, thermal neutron fission reaction can be initiated in the plutonium with the proton source de-energized. In the second step, further transmutation of the radiotoxic materials may be achieved with the proton source energized.

During the first step, the critical, self-sustaining, thermal neutron fission reaction initiated in the plutonium will produce fast neutrons. These fast neutrons will radiate from the plutonium towards the toxic fission products and the minor actinides. Since the plutonium is held in a moderating graphite block, the fast neutrons will pass through the moderator before reaching either the minor actinides or the toxic fission products. Nevertheless, some of these neutrons will reach the minor actinides with energies in the fast spectrum, where they will be effective in fissioning a portion of the minor actinides, and creating new fast neutrons to fission additional amounts of minor actinides. Similarly, some neutrons will reach the toxic fission products with energies in the thermal spectrum, where they will be effective in transmuting a portion of the toxic fission products. Consequently, in the first step of operation, a portion of the plutonium, the minor actinides and the toxic fission products will be transmuted into one or more stable, less radiotoxic isotopes.

In the second step of operation, a beam of protons is directed from the proton source into the housing and onto the spallation target. As the protons impact the spaliation target, fast neutrons are generated by the target which travel towards the radiotoxic materials. A portion of the fast neutrons generated at the spallation target react with the minor actinides, causing the minor actinides to transmute by either fission or neutron capture reactions into one or more stable, less radiotoxic isotopes.

The residual fast neutrons from the spallation target will enter the graphite block travelling towards the toxic fission products and plutonium. Additionally, the fast neutron fissioning of the minor actinides will generate neutrons, a portion of which will enter the graphite block travelling toward the toxic fission products and the plutonium.

While passing through the moderating graphite block the neutrons will react with the graphite and lose energy. Consequently, within the graphite block, the energies of the neutrons are, on average, highest near the spallation target. After passing through a portion of the graphite block, the moderated neutrons will react with the toxic fission products and the plutonium causing the toxic fission products and the plutonium to transmute into one or more stable, less radiotoxic isotopes. Within the graphite block, the toxic fission products are positioned closer to the spallation target than the plutonium to take advantage of the fact that the toxic fission products transmute more efficiently when reacted with the higher energy, higher flux neutrons.

The heat generated in the various transmutation processes described above is regulated and controlled by the device of the present invention in several ways. Primary temperature regulation is achieved by circulating helium through the inside of the housing. Specifically, helium is circulated inside the housing between the conductive tubes and through cooling channels formed in the graphite block. Further, the device of the present invention is designed and configured to be passively safe. Consequently, a melt-down can be avoided in the event of a helium coolant failure. For example, the minor actinides are placed in thermally conductive tubes for the purposes of conducting heat away from the minor actinides. Also, the ratio of minor actinides to plutonium charged into the transuranic transmuter can be controlled. Lastly, the reaction rates can be controlled by varying the power of the proton beam.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
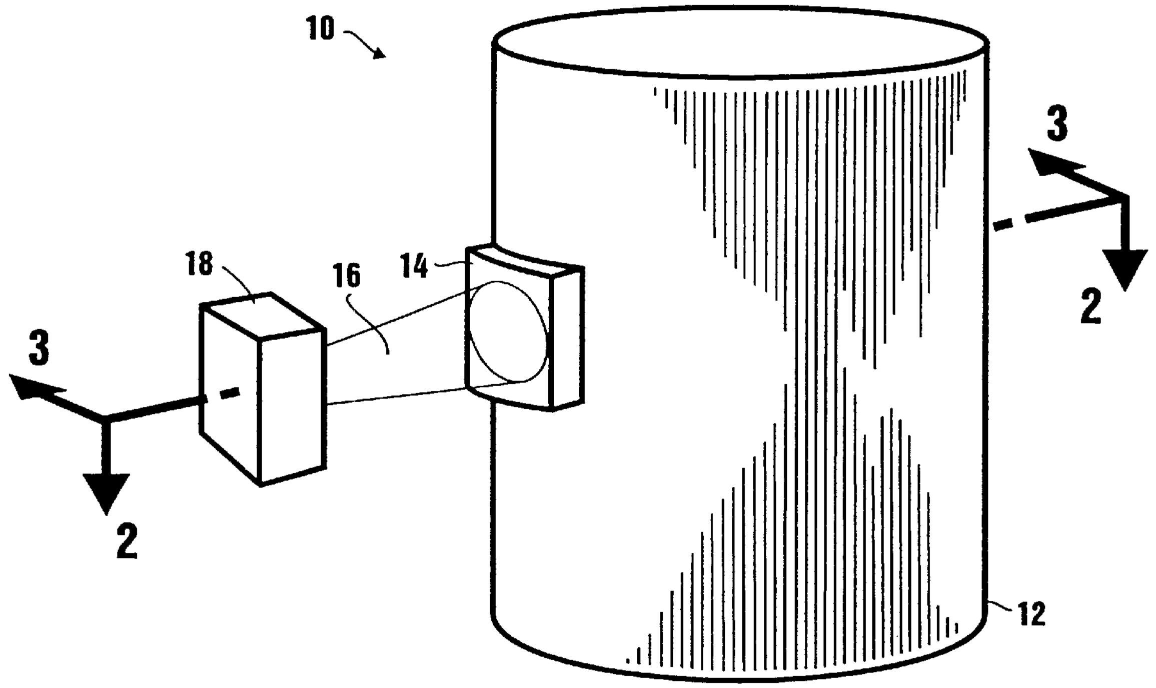
FIG. 1 is a perspective view of a transuranic transmuter of the present invention showing the housing, window and beam of protons.

Referring initially to FIG. 1, a transuranic transmuter capable of simultaneously transmuting both fissile and non-fissile radioactive materials in accordance with the present invention is shown and generally designated 10. For purposes of the present invention, the transuranic transmuter 10 includes a sealable, cylindrical shaped housing 12 having a window 14 to allow a beam of protons 16 to enter the housing 12. Preferably, the housing is formed with a large length to diameter ratio to allow for adequate heat removal.

Figure 2:
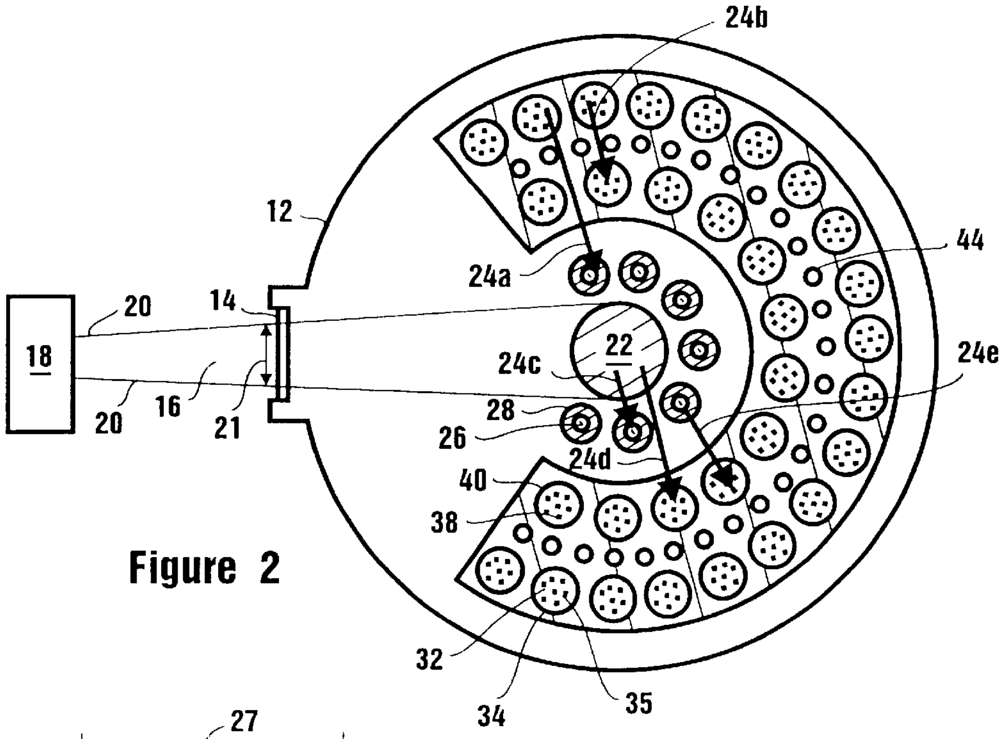
FIG. 2 is a cross sectional view of the transuranic transmuter as seen along line 2—2 in FIG. 1 showing the beam of protons, spallation target the radioactive material to be transmuted.

As shown in FIGS. 1 and 2, the transuranic transmuter 10 includes a proton source 18 such as a particle accelerator. A 10 MW proton source 18 capable of emitting protons 16 having energies of approximately 1,000 MeV and a current of approximately 10 mA is suitable for the present invention. The protons 16 are directed from the proton source 18 onto a beam path 20 and towards the window 14 of the housing 12. A typical beam path 20 for purposes of the present invention has a conical shape and a diameter 21 of about 50 cm, at the window 14 of the housing 12, perpendicular to proton motion. An alternate beam path would typically be about 1.6 meters tall and 15 cm wide at the window 14 (not shown). The housing 12 is preferably sealable, air-tight and constructed primarily from steel. A window 14 is provided to allow the protons 16 to enter the housing 12. A spallation target 22 is positioned inside the housing 12 and along the beam path 20. To summarize, the protons 16 emanate from the proton source 18, travel along the beam path 20, enter the housing 12 through the window 14 and strike the spallation target 22. The spallation target 22 can be made of any material known in the pertinent art, such as tungsten, which will emit fast neutrons 24 in response to collisions between the protons 16 and the target 22.

Figure 4:
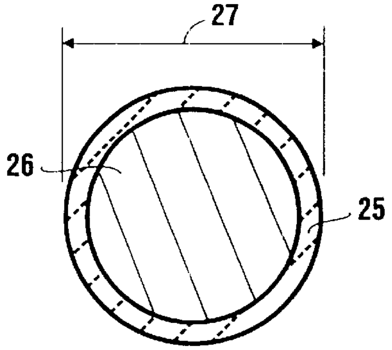
FIG. 4 is a cross-sectional view of a ceramic coated minor actinide microsphere.

For purposes of the present invention, a layer of non-fissile material 26 is positioned adjacent to the spallation target 22. By cross-referencing FIGS. 2 and 3, it can be seen that the non-fissile material 26 can be held in thermally conductive tubes 28. As shown in FIG. 4, the non-fissile material 26 is preferably formed as a microsphere having a ceramic coating 25 such as silicon carbide. Encapsulation of the radiotoxic material in a ceramic coating that is impervious to water allows for direct post-transmutation burial. In the preferred embodiment, the microspheres of non-fissile material 26 have a diameter 27 of approximately 1.5 mm. The thermally conductive tubes 28 both hold the microspheres of non-fissile material 26 and conduct heat that is generated in the transmutation processes away from the non-fissile material 26. The conductive tubes 28 may be made from any suitable high temperature, conductive material known in the pertinent art, such as tungsten. Further, FIG. 2 shows a representative layer of non-fissile material 26 composed of seven conductive tubes 28 of non-fissile material 26 arranged in a semi-circle immediately adjacent to and partially surrounding the spallation target 22.

For purposes of the present invention, non-fissile material 26 can be any material that is not efficiently transmuted with thermal neutrons. The following minor actinides are considered non-fissile materials 26 for present purposes: Americium, Curium and Neptunium. Although non-fissile, the minor actinides such as Americium, Curium and Neptunium can undergo transmutation by either a fission process or a neutron capture process upon reaction with fast neutrons. Further, as used herein, the term transmute refers to any process which modifies the nucleus of an atom such that the product nucleus has either a different mass number or a different atomic number than the reactant nucleus, and includes the fission, absorption and scattering processes.

Figure 5:
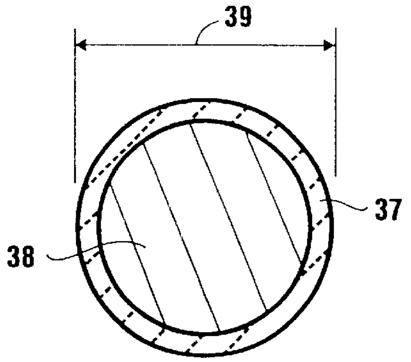
FIG. 5 is a cross-sectional view of a ceramic coated toxic fission product microsphere.
Figure 6:
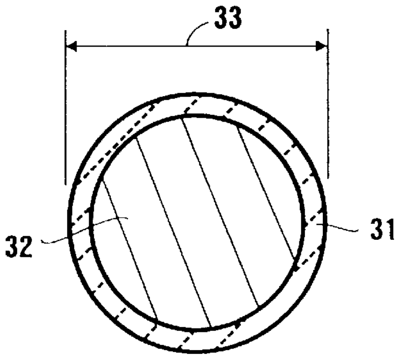
FIG. 6 is a cross-sectional view of a ceramic coated plutonium microsphere.
Figure 3:
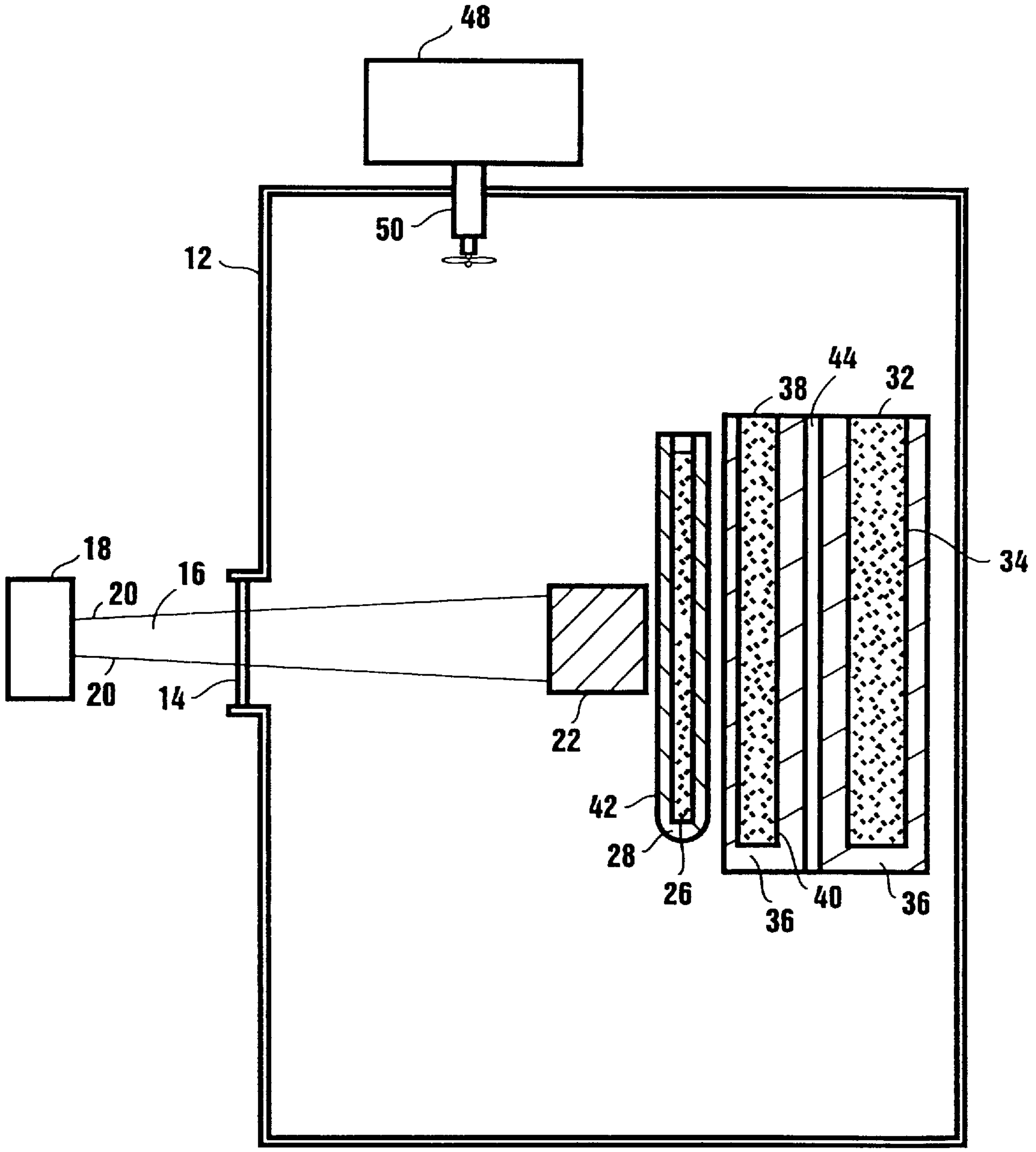
FIG. 3 is a cross-sectional view of the transuranic transmuter as seen along line 3—3 in FIG. 1, also showing the beam of protons, spallation target and the radiotoxic material to be transmuted.

As shown in FIGS. 2 and 3, a graphite block moderator 36 is positioned inside the housing 12 to interpose the non-fissile layer 26 between the graphite block moderator 36 and the spallation target 22. The graphite block moderator 36 is formed with recesses 40 to hold the toxic fission products 38. As shown in FIG. 5, the toxic fission products 38 are preferable formed as microspheres having a ceramic coating 37 such as silicon carbide. In the preferred embodiment, the microspheres of toxic fission products 38 have a diameter 39 of approximately 1.5 mm. As further shown in FIGS. 2 and 3, the graphite block moderator 36 is also formed with recesses 34 to hold the fissile material 32. As shown in FIG. 6, the fissile material 32 is preferable formed as microspheres having a ceramic coating 31 such as silicon carbide. In the preferred embodiment, the microspheres of fissile material 32 have a diameter 33 of approximately 1.5 mm. It is also contemplated for the present invention that the ceramic coated microspheres will be further coated with pyrolitic carbon buffers and other protective coatings that are well known in the pertinent art. Additionally, the ceramic coated microspheres of fissile material 32 may be suspended in carbon matrix pellets 35 within the recesses 34 of the graphite block moderator 36.

As shown in FIGS. 2 and 3, a layer of toxic fission products 38 can be positioned at a distance from the spallation target 22. Specifically, referring now to FIG. 2, thirteen recesses 40 of toxic fission products 38 making up a representative layer are shown arranged in a semi-circle adjacent to the non-fissile material 26. For purposes of the present invention, a toxic fission product 38 is a material such as a Technetium or Iodine isotope which can be transmuted with thermal neutrons. Although the toxic fission products 38 as shown are contained in the recesses 40 that are formed in a graphite block moderator 36, any toxic fission products 38 layer configuration known in the pertinent art may be used.

Additionally, a fissile layer 32 may be positioned at a distance from the spallation target 22. Preferably, the fissile layer 32 is positioned further from the spallation target 22 than the toxic fission products layer 38. Specifically, referring now to FIG. 2, eighteen recesses 34 of fissile material 32 making up a representative layer are shown arranged in a semi-circle behind the layer of toxic fission products 38 to interpose both the layer of non-fissile material 26 and the layer of toxic fission products 38 between the spallation target 22 and the fissile material 32. For purposes of the present invention, a fissile material 32 is a material such as a plutonium or uranium isotope which efficiently fissions upon reaction with thermal neutrons. It is contemplated for the present invention that the plutonium may be GT-MHR particle fuel type plutonium. Although the fissile material 32 is shown contained in recesses 34 formed in a graphite block moderator 36, any other configuration known in the pertinent art may be used for the layer of fissile material 32.

In operation, the transmutation of the radiotoxic material can be efficiently conducted in a two step process. In the first step, a critical, selfsustaining, thermal neutron fission reaction can be initiated in the fissile layer 32 with the proton source 18 de-energized. In the second step, further transmutation of the radiotoxic materials 26, 32, 38 may be achieved with the proton source 18 energized. As described more fully below, the first step may not be required. In the preferred embodiment of the present invention, the transuranic transmuter 10 is efficiently sized to take advantage of the two-step transmutation process discussed above.

Specifically, in the first step, the radiotoxic material 26, 32, 38 is placed in the transuranic transmuter 10, and a critical, self-sustaining, thermal neutron fission reaction is initiated and allowed to proceed until a predetermined amount of fissile material 32 remains. Allowing the fissile material 32 to first transmute in a critical, self-sustaining, thermal neutron fission reaction, followed by transmutation in a non-critical thermal neutron fission reaction provides several advantages over a one-step process where all transmutation occurs with the proton source 18 energized. First, the transuranic transmuter 10 can be constructed with a smaller, less powerful proton source 18. Second, since a portion of the transmutation occurs with the proton source de-energized, energy is conserved. Lastly, the dimensions of the transuranic transmuter 10 can be reduced. Alternatively, the critical, self-sustaining, thermal neutron fission reaction (first step) could be conducted at a commercial reactor, in which case the transuranic transmuter 10 described above will be properly sized to complete the non-critical thermal neutron fission reaction (second step).

The first step takes advantage of the fact that fissile materials 32 such as Plutonium can undergo a critical, self-sustaining, thermal neutron fission reaction. Consequently, in the absence of an external supply of thermal neutrons, a critical, self-sustaining, thermal neutron fission reaction can be initiated in the fissile material 32 resulting in a portion of the fissile material 32 being transmuted into one or more stable isotopes. Specifically, a portion of the fissile material 32 can be transmuted in a critical, self-sustaining, thermal neutron fission reaction prior to energizing the proton source 18. However, the critical, self-sustaining, thermal neutron fission reaction can only continue while a critical amount of fissile material 32 is present. As the reaction proceeds, the amount of fissile material 32 decreases until the reaction is no longer self-sustaining. Consequently, only a portion of the fissile material 32 can be transmuted prior to energizing the proton source 18.

During the first step, the critical, self-sustaining, thermal neutron fission reaction initiated in the fissile layer 32 will produce fast neutrons 24*a,b*. These fast neutrons 24*a,b* will radiate from the fissile layer 32 towards the toxic fission products 38 and the non-fissile layer 26. Since the fissile material 32 is held in a graphite block moderator 36, the fast neutrons 24*a,b* generated in the fissile layer 32 will pass through the graphite block moderator 36 before reaching either the non-fissile layer 26 or the toxic fission products 38. Nevertheless, some neutrons, such as neutron 24*a* shown in FIG. 2, will reach the non-fissile layer 26, with energies in the fast spectrum, where they will be effective in transmuting a portion of the non-fissile material 26. Similarly, some neutrons, such as neutron 24*b* will reach the toxic fission products 38, with energies in the thermal spectrum, where they will be effective in transmuting a portion of the toxic fission products 38. Further, these secondary transmutation reactions may generate neutrons, and these generated neutrons may effectively react with any of the radiotoxic materials 26, 32, 38 causing still further transmutation. Consequently, in the first step of operation, a portion of the fissile layer 32, a portion of the non-fissile layer 26 and a portion of the toxic fission products 38 will be transmuted into one or more stable, less radiotoxic isotopes. It is contemplated for the present invention that the duration of the first step will be approximately three years.

Additional transmutation of the radiotoxic material 26, 32, 38 can be achieved in the second step with the proton source 18 energized. It is contemplated for the present invention that the duration of the second step will be approximately one year. In the second step of operation, a beam of protons 16 is directed from the proton source 18 into the housing and onto the spallation target 22. As the protons 16 impact the spallation target 22, fast neutrons 24*c,d* are generated by the target 22 and travel towards the radiotoxic materials 26, 32, 38. A portion of the fast neutrons generated at the spaliation target, such as neutron 24*c* shown in FIG. 2, react with the nonfissile material 26, causing the non-fissile material 26 to transmute by either fission or neutron capture reactions into one or more stable, less radiotoxic isotopes. Additionally, the residual fast neutrons 24*d* from the spallation target will reach and enter the graphite block moderator 36 travelling towards the layer of toxic fission products 38 and the layer of fissile material 32.

While passing through the graphite block moderator 36 the residual fast neutrons 24*d* will react with the graphite block moderator 36 and lose energy. Consequently, within the graphite block moderator 36, the energies of the residual neutrons 24*d* will be highest near the spallation target. After passing through a portion of the graphite block moderator 36, the moderated residual neutrons 24*d* will react with the toxic fission products 38 and the fissile material 32 causing the toxic fission products 38 and the fissile material 32 to transmute into more stable, less radiotoxic isotopes. Within the graphite block moderator 36, the toxic fission products 38 are positioned closer to the spallation target 22 than the fissile material 32 to take advantage of the fact that the toxic fission products 38 transmute at a faster rate when reacted with the higher energy, higher flux, residual neutrons 24*d*.

Upon transmutation, each radiotoxic material 26, 32, 38 may generate neutrons 24*e* as a by-product of the fission reaction. FIG. 2 shows a representative generated neutron 24*e* emanating from the non-fissile material 26 and passing through the conductive tube 28. These neutrons 24*e* that are generated by the transmutation reactions are available for further transmutation of the radiotoxic materials 26, 32, 38.

Each of the transmutation processes described above are known to generate heat at a process specific rate, and the heat generated must be controlled or removed from the transmuting material 26, 32, 38 to prevent overheating, melting or damage to the transuranic transmuter 10. With this in mind, the transuranic transmuter 10 has been constructed with several design features to control or remove heat from the transmuting material 26, 32, 38.

First, referring now to FIG. 3, a helium source 48 and circulator 50 are provided to circulate helium (forced cooling) as a coolant through the inside of the housing 12 and between the conductive tubes 28. Further, the graphite block moderator 36 is formed with cooling channels 44 to allow helium to be circulated within the graphite block moderator 36. Helium is chosen because it is virtually transparent to neutrons. Additionally, helium is chemically inert, and consequently, nuclear and chemical coolant-fuel interactions are minimized. Further, the helium remains in the gaseous state providing reliable cooling that is easy to calculate and predict. Still further, protons 16 at the expected energies (see discussion above) can travel with essentially no energy loss through helium gas for several kilometers. As shown in FIG. 3, helium is circulated within the entire housing 12, and consequently, the beam of protons 16 must pass through the gaseous helium on the beam path 20 between the window 14 and the spallation target 22.

Second, the non-fissile material 26 is held in conductive tubes 28 to allow heat generated within the non-fissile material 26 to be conducted to the outside 42 of the tube 28.

Third, the energy level of the beam of protons 16 can be controlled to modify the amount of fast neutrons generated at the spallation target 22. Consequently, the rate of transmutation and the corresponding rate of heat generation can be controlled by varying the energy of the beam of protons 16.

Fourth, the ratio of non-fissile material 26 (undergoing fast neutron transmutation) to fissile material 32 (undergoing primarily thermal neutron transmutation) can be held small to avoid excessive heat generation. As discussed above, spent fuel from commercial reactors generally contains approximately ten times more plutonium than minor actinides. When ten parts plutonium and one part minor actinides are reacted as herein disclosed in the transuranic transmuter 10, the transmuter 10 will be passively safe. Specifically, overheating can be avoided in the event of a failure in the helium source 48.

While the particular Accelerator Driven, Transuranic, Gas Cooled Transmuter as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device for the transmutation of fissile and non-fissile materials comprising:

means for directing a beam of protons along a beam path;

a spallation target positioned on said beam path for generating fast neutrons in response to collisions between said protons and said target;

a layer of fissile material positioned at a distance from said spallation target; and a layer of non-fissile material interposed between said layer of fissile material and said spallation target for fast neutron transmutation of said non-fissile material by said fast neutrons released from said spallation target, and for transmission of residual fast neutrons and neutrons generated during said fast neutron transmutation of said non-fissile material for subsequent transmutation of said fissile material.

2. A device as recited in claim 1 wherein said fissile material is Plutonium.

3. A device as recited in claim 1 wherein said fissile material is formed as microspheres and includes a ceramic coating encapsulating said microsphere.

4. A device as recited in claim 1 wherein said non-fissile material is formed as microspheres and includes a ceramic coating encapsulating said microsphere.

5. A device as recited in claim 1 wherein said non-fissile material is selected from the group consisting of Americium, Curium and Neptunium.

6. A device as recited in claim 1 further comprising a thermally conductive tube for containing said non-fissile material.

7. A device as recited in claim 1 further comprising a housing, and wherein said spallation target, said fissile material and said non-fissile material are positioned within said housing, and wherein Helium is circulated through said housing for temperature regulation inside said housing.

8. A device as recited in claim 1 further comprising a moderating material, said moderating material being interposed between said non-fissile material layer and said fissile material layer for reducing the energy of neutrons passing through said moderating material.

9. A device as recited in claim 1 further comprising a layer containing at least one toxic fission product, said layer containing at least one toxic fission product being interposed between said layer of fissile material and said layer of non-fissile material, to receive neutrons from said spallation target for transmutation of said toxic fission products.

10. A device as recited in claim 9 wherein said toxic fusion product is selected from the group consisting of Technetium and Iodine.

11. A device as recited in claim 9 further comprising a graphite block formed with a plurality of recesses to contain said layer of fissile material and a plurality of recesses to contain said layer of toxic fission products.

12. A device as recited in claim 11 wherein said graphite block is formed with cooling channels.

13. A device as recited in claim 9 wherein said toxic fission product is formed as microspheres and further comprise a ceramic coating.

14. A device as recited in claim 1 wherein said means for directing a beam of protons comprises a particle accelerator.

15. A device as recited in claim 7 wherein the ratio of said non-fissile material to said fissile material is selected to allow for non-forced cooling transmutation of said non-fissile material and said fissile material at non-excessive temperatures.

16. A device for the transmutation of fissile and non-fissile materials comprising:

a housing;

means for generating fast neutrons within said housing;

a layer of fissile material positioned within said housing;

a layer of non-fissile material positioned within said housing for fast neutron transmutation of said non-fissile material by said fast neutrons;

a moderator positioned within said housing to thermalize said fast neutrons travelling towards said layer of fissile material to create thermalized neutrons, for thermal neutron transmutation of said fissile material; and a means for maintaining a temperature within said housing.

17. A device as recited in claim 16 wherein said means for generating fast neutrons comprises:

a particle accelerator for directing a beam of protons along a beam path; and a spallation target positioned on said beam path and within said housing for generating fast neutrons in response to collisions between said protons and said target.

18. A device as recited in claim 16 wherein said fissile material comprises Plutonium.

19. A device as recited in claim 16 further comprising a layer containing at least one toxic fission product positioned within said housing.

20. A method of transmutating both fissile and non-fissile materials comprising the steps of:

providing a spallation target;

positioning a layer of fissile material at a distance from said spallation target;

interposing a layer of non-fissile material between said layer of fissile material and said spallation target;

interposing a moderator between said layer of fissile material and said layer of non-fissile material; and thereafter initiating a critical self-sustaining thermal fission reaction within said layer of said fissile material to transmute at least a portion of said fissile material and to generate neutrons for transmutation of a first portion of said non-fissile material; and thereafter directing a beam of protons onto said spallation target to generate fast neutrons in response to collisions between said protons and said target, a portion of said fast neutrons for transmutation of a second portion of said non-fissile material, and residual said fast neutrons for passing through said moderator to subsequently transmute a portion of said fissile material.

* * * * *

UNITED STATES PATENT AND TRADEMARK OFFICE

CERTIFICATE OF CORRECTION

PATENT NO. : 6,472,677 B1 Page 1 of 1
DATED : October 29, 2002
INVENTOR(S) : Carmelo Rodriguez and Alan M. Baxter It is certified that error appears in the above-identified patent and that said Letters Patent is hereby corrected as shown below:

Column 3,
Line 29, delete "spaliation" insert -- spallation --

Column 7,
Line 36, delete "spaliation" insert -- spallation --

Signed and Sealed this

Twenty-fifth Day of February, 2003

JAMES E. ROGAN
*Director of the United States Patent and Trademark Office*